United States Patent [19]

Obergefell et al.

[11] 3,709,433

[45] Jan. 9, 1973

[54] METHOD OF AND APPARATUS FOR GENERATING MIST

[75] Inventors: Ronald F. Obergefell, Richmond Heights; Edward E. Kish, Cleveland Heights, both of Ohio

[73] Assignee: Handaille Industries, Inc., Buffalo, N.Y.

[22] Filed: March 25, 1971

[21] Appl. No.: 128,012

[52] U.S. Cl. ......................239/8, 239/338, 239/343, 239/366, 239/370, 239/434

[51] Int. Cl. ..........................................B05b 7/30

[58] Field of Search..........239/8, 338, 343, 346, 364, 239/369, 370, 366, 434; 222/193; 46/6, 7, 8; 55/87, 178

[56] References Cited

UNITED STATES PATENTS

| | | | |
|---|---|---|---|
| 2,587,895 | 3/1952 | Quinn | 46/7 |
| 3,527,411 | 9/1970 | Colgan | 239/338 |
| 3,618,856 | 11/1971 | Sachnik | 239/8 |
| 3,421,692 | 1/1969 | Babington et al. | 239/8 |

FOREIGN PATENTS OR APPLICATIONS

| | | | |
|---|---|---|---|
| 270,910 | 7/1964 | Netherlands | 239/338 |
| 405,389 | 2/1934 | Great Britain | 55/87 |

*Primary Examiner*—Lloyd L. King

*Assistant Examiner*—John J. Love

*Attorney*—Hill, Sherman, Meroni, Gross & Simpson

[57] ABSTRACT

A method of producing a fine mist or aerosol by means of a pressurized-gas operated mist generating head in which a foam or bubbles of liquid are supplied to the mist generating head. Apparatus for producing a mist or aerosol by means of said method.

10 Claims, 3 Drawing Figures

INVENTORS
RONALD F. OBERGEFELL
EDWARD E. KISH

BY Hill, Sherman, Meroni, Gross & Simpson ATTORNEYS

INVENTORS
RONALD F. OBERGEFELL
EDWARD E. KISH

BY Hill, Sherman, Meroni, Gross & Simpson ATTORNEYS

METHOD OF AND APPARATUS FOR GENERATING MIST

BACKGROUND OF THE INVENTION

There is a growing number of applications for mists or aerosols which comprise a dispersion of liquid in a gas medium, the liquid being dispersed in droplets which are so small that the mist or aerosol approaches in many respects the characteristics of natural fog.

Applications of such mists or aerosols exist in a variety of fields, including humidification, chemical treatment, coating, fuel atomization, food processing and lubrication. Applications of mists in addition to the foregoing, however, will readily come to mind.

For convenience, the present invention will be described in the art association of an oil mist lubricating system, since one of the important applications of the invention resides in the lubrication field. It will be apparent to those skilled in the art, however, that the present invention is of utility in the production of mist or aerosols for a variety of applications of which the lubrication field is only exemplary.

In the prior art mists or aerosols are produced by various apparatus which employs a stream of pressurized gas to serve as a medium for liquid particles after the gas stream has itself reduced the liquid to particle size. One system known in the prior art relies upon the principles of a venturi for breaking down a stream of liquid into extremely small and substantially uniform particles. See, for example, U.S. Pat. No. 3,491,855 of which one of the joint applicants hereof is joint patentee.

Another known system involves the utilization of the principles of vortex for subjecting a stream of liquid to a stream of high pressure gas with a resulting reduction of the liquid to particle size, which particles are carried away and dispersed within the gas. See, for example, Hierta et al. U.S. Pat. No. 3,515,676.

Yet another method which employs pressurized gas is disclosed in Babington et al. U.S. Pat. No. 3,421,692. In this latter method a stream of liquid is deposited on a downwardly sloping smooth unconfining surface in which an aperture is formed. As the liquid flows downwardly over the surface it is subjected to an internal lateral stress, the magnitude of which depends upon the extent to which the liquid is caused to film out on the surface, which in turn depends upon the adhesive properties of the liquid with respect to the surface and the cohesive strength of the molecules of the liquid itself. The ability of the liquid to "film out" on the surface is discussed in detail in said Babington et al. U.S. Pat. No. 3,421,692. This latter method of producing mist may be conveniently referred to as the "wet surface" method, as contrasted with the "venturi" method disclosed in said Obergefell et al. U.S. Pat. No. 3,491,855 and with said "vortex" method disclosed in said Hierta et al. U.S. Pat. No. 3,515,676.

Regardless of whether the venturi method or the vortex method or the wet surface method is employed, however, there exists the necessity for subjecting the liquid to a stream of pressurized gas such as air or the like and the physical structure or apparatus which performs the function of subjecting the liquid to the pressurized stream of gas may be conveniently referred to herein as a mist generating head. It will be appreciated, therefore, that as used herein the term "mist generating head" may refer to apparatus which employs either the venturi method, the vortex method or the wet surface method of mist generation.

While all three of these known methods of producing mist are satisfactory for the intended purpose it has been determined that the efficiency of the method and the characteristics of the mist produced thereby can be improved by virtue of the present invention. The aforementioned result obtains regardless of whether the resulting mist is used in conjunction with a mist lubrication system, an exemplary embodiment of which is disclosed in said Obergefell et al. U.S. Pat. No. 3,491,855, or in any other aerosol or mist application.

SUMMARY OF THE INVENTION

In light of the foregoing the present invention may be defined as a method of and apparatus for generating a mist or aerosol by prestressing the liquid before it is subjected to the effects of the pressurized stream of gas. The liquid is prestressed by subjecting it to a jet of gas which forms a foam of small gas-filled bubbles. The liquid which forms the enclosures of the bubbles is in the form of a thin internally stressed film. Thus when the pressurized stream of gas medium is introduced to the bubbles of the foam the liquid film forming the enclosure of each bubble is atomized to become dispersed within the gas medium and to produce mist similar to that produced by the venturi, vortex or wet surface methods of mist generation known heretofore.

The present invention is disclosed herein in the art association of a "wet surface" method of mist generation but the principles of the invention are of equal utility in the venturi and vortex methods of mist generation discussed hereinabove. For that reason said U.S. Pat. Nos. 3,421,699; 3,491,855 and 3,515,676 are incorporated herein by reference.

In all three of the above methods of producing mist known heretofore the stream of pressurized air subjects the liquid to a condition of high stress, as a consequence of which the liquid is broken up into very fine particles. By virtue of the present invention, however, the liquid is already in the form of highly stressed film so that when it becomes subjected to the additional stress caused by the stream of pressurized gas it is broken down into fine particles much more easily, that is, using less gas per unit of liquid. Thus if air, for example, is being used as the gas medium the C.F.M. of air required at a predetermined pressure for a given rate of mist production is less. Thus the efficiency of the mist generating system is increased. In addition the size of the liquid particles are generally smaller and more uniform in size.

It is, therefore, an object of the present invention to provide an improved method of and apparatus for generating a mist or aerosol.

Another object is to increase the efficiency of a mist producing system.

Many other features, advantages and additional objects of the present invention will become manifest to those versed in the art upon making reference to the detailed description which follows and the accompanying sheet of drawing, in which preferred structural embodiments incorporating the principles of the present invention are shown by way of illustrative example only.

DESCRIPTION OF THE PREFERRED EMBODIMENTS

Figures 1, 3:
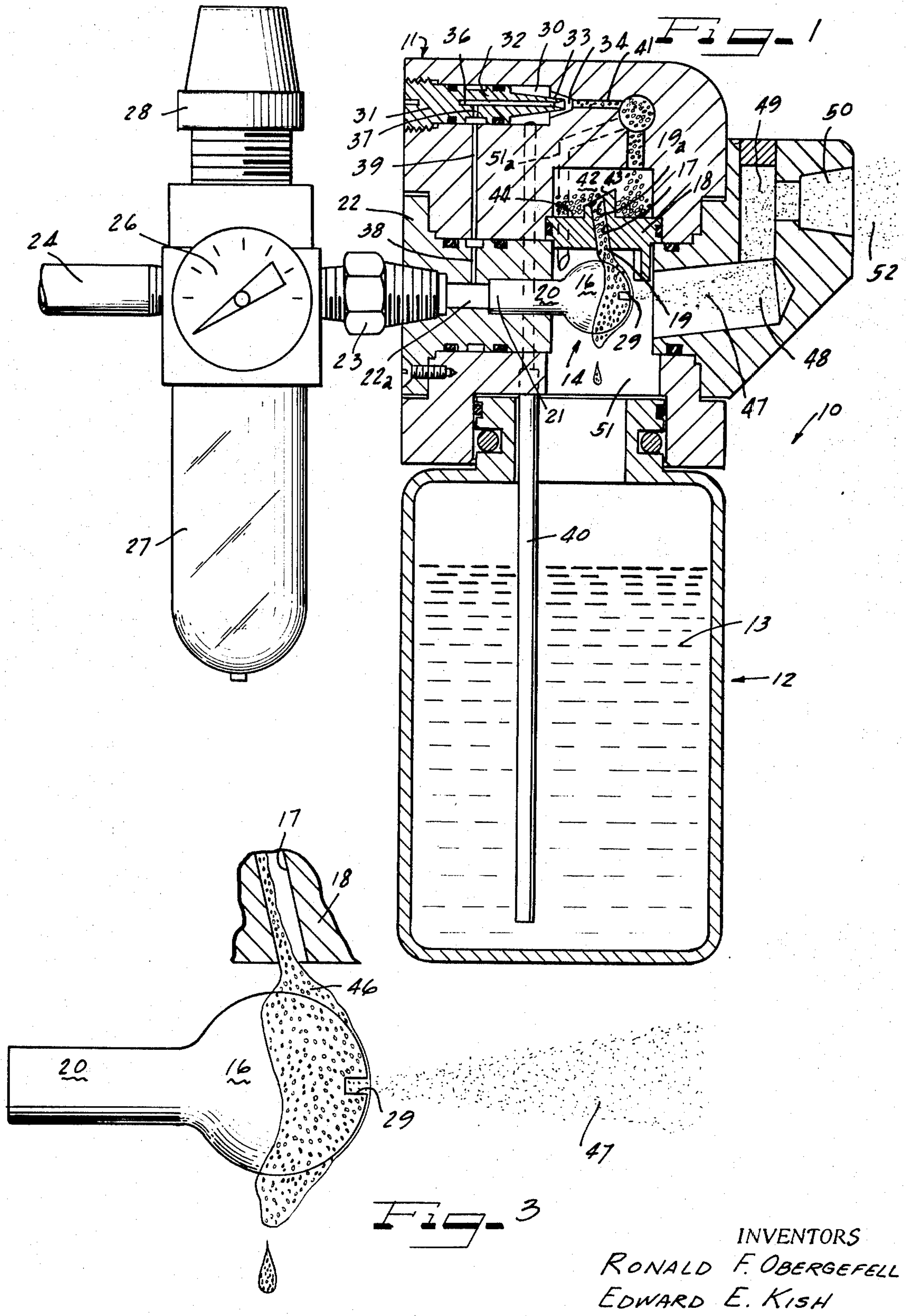
FIG. 1 is a sectional view of a mist generating system incorporating the principles of the present invention.
FIG. 3 is an enlarged view of a so-called "wet ball" which is used in the embodiments shown in FIGS. 1 and 2.

FIG. 1 illustrates a mist generating system incorporating the principles of the present invention. The embodiment shown in FIG. 1 includes a mist generating head which incorporates the principles of the wet surface method of mist generation discussed hereinabove in connection with Babington et al. U.S. Pat. No. 3,421,692 but it will be understood that the principles of the present invention find equal utility in other methods of generating mist including the venturi and vortex methods discussed hereinabove.

The mist generating apparatus shown in FIG. 1 comprises generally a housing indicated at reference numeral 10 including an upper portion 11 and a lower portion 12. The upper and lower portions 11 and 12 are joined together by any suitable means such as threaded fasteners or the like. The upper housing portion 11 encloses various components of the system whereas the lower portion 12 serves primarily as a reservoir for a supply of liquid shown at 13. Since the mist generating system 10 may be advantageously used in centralized oil mist lubrication systems the liquid 13 will be referred to herein as oil and the mist or fog generated by the system 10 as constituting oil mist but it will be understood that such terms are being used herein for convenience since the system 10 may be utilized in generating mist from any liquid and using any gas as the gas medium of the mist.

The system 10 may be more particularly characterized as comprising a mist generating head indicated generally at reference numeral 14 which, in the embodiment illustrated, comprises a generally spherically shaped member 16, which may be conveniently referred to as a "wet ball" and a delivery tube 17 formed in a block member 18 and having a discharge end 19 situated in closely spaced relation to the outer surface of the wet ball 16.

As will be understood by those skilled in the art, the wet ball 16 is hollow and is formed on the end of a hollow tube 20 having a tubular end 21 which extends into an internal chamber **22*a* of a plenum 22**.

Threaded into the plenum 22 in communication with the chamber **22*a* is a conduit 23 which may be connected to any suitable source of pressurized gas. In the embodiment illustrated it will be assumed that the gas medium for the oil mist is air and that an outer end 24 of the conduit 23 is connected to a suitable source of pressurized air such as an air compressor. Mounted in the conduit 23 is an air pressure gauge 26 and a filter 27. Also mounted in the conduit 23 is an adjustable pressure regulator 28 for selectively varying the pressure of the air being supplied to the plenum chamber 22*a***.

Pressurized air from the plenum chamber **22*a* flows through the tube 20 to the interior of the wet ball 16 from whence it flows through a small slit or aperture 29** formed therein.

Located in the upper housing portion 11 is a venturi chamber 30 in which is disposed a venturi plug 31. Projecting from a generally cylindrically shaped portion 32 of the plug 31 is a nose section 33, the forward end of which is disposed in a conical chamber 34.

Extending through a portion of the plug 31 is an axial passage 36 which communicates with a radial passage 37. The passage 37 communicates with the plenum chamber **22*a* through aligned passages 38 and 39**.

The forward end of the passage 36 formed in the venturi plug 31 converges outwardly to reduce the pressure in the chamber 30 by virtue of eduction principles, as will be appreciated by those skilled in the art. The chamber 30 communicates with the oil 13 located within the reservoir 12 through an oil supply tube 40.

In operation, a substantial portion of the air which enters the plenum chamber 22a through the conduit 24 flows through the wet ball 16 and issues from the aperture 29 as a fine jet of air. A smaller portion of the air flows through passages 38 and 39 into the venturi plug 31, and as it issues from the passage 36 it provides a reduced pressure in the chamber 30 by virtue of which a supply of oil is drawn up through the supply tube 40.

The oil is subjected to the stream of air issuing from the venturi plug 31 to form an oil foam in the discharge passage 41 communicating with the conical chamber 34. The oil foam is comprised of extremely small bubbles which are substantially uniform in size. The foam is conducted through the passage 41 into a supply chamber 42 which communicates with the passage 17 located adjacent the wet ball 16.

An upper end **19*a* of the passage 17 is formed in a protuberance 43 which extends above a top wall 44 of the block member 18. This arrangement ensures that the foam in the chamber 42 must rise above the end 19*a* of the passage 17 before it will discharge through the passage 17 down to the surface of the wet ball 16**.

The bubbles which comprise the oil foam as it flows over the outer surface of the wet ball 16 are enclosed respectively by a film of oil. This film, of course, is under an internal stress which results from the pressure of the air within the bubble.

Referring to FIG. 3, the oil foam flows downwardly over the outer surface of the wet ball 16 in a relatively thin layer and a substantial portion thereof drips back into the reservoir 12 from the bottom of the wet ball 16. As it flows across the wet ball 16, however, the film of oil surrounding each bubble in contact with the surface of the wet ball is subjected to an additional internal lateral stress, the magnitude of which depends upon the adhesive properties of the oil vis-a-vis the surface of the wet ball 16 and, of course, the cohesive strength of the molecules of the oil itself.

FIG. 3 illustrates somewhat diagrammatically or pictorially the appearance of a layer of oil foam, indicated at reference numeral 46 as it flows from the passage 17 over the surface of the wet ball 16. Assuming that the adhesive properties of the surface of the wet ball 16 relative to the oil which comprises the foam 46 is greater than the cohesive strength between the molecules of the oil itself so that the surface of the wet ball 16 is "wettable" relative to the oil, the oil within the bubbles of the foam 46 will tend to film out or spread even further over the surface of the wet ball 16. This additional filming out or spreading produces additional internal stresses in the liquid oil film and particularly as it approaches and passes over the aperture 29. As the jet of gas (air, in the illustrated embodiment) engages the film of oil which is prestressed first of all because of the formation of the bubbles and secondly because of the wetting action of the surface of the wet ball 16, the film of oil surrounding the individual bubbles is broken down into minute particles and dispersed within and carried by the gas to produce a fog or mist as indicated at reference numeral 47.

Passages 48–50 communicate with a chamber 51 in which the mist generating head 14 is disposed to direct the oil mist or fog 47 issuing from the head 14 to an outlet 52 formed in the upper housing portion 11, and thence to one or more points of utilization, such as the several bearings of a multi-bearing machine.

It is noted that the present invention differs from the mist generating systems known heretofore in that the liquid or oil is additionally prestressed before it is subjected to the impact of the stream or jet of pressurized gas by virtue of the fact that it is in the form of bubbles or foam when subjected to the gas or air stream. In the systems known heretofore the liquid which is to be atomized is either in the form of a solid stream of liquid as it is introduced to the stream or jet of pressurized air or, as is shown in said Babington et al. U.S. Pat. No. 3,421,692, is prestressed in the form of a film by spreading the liquid over a wettable surface before it is subjected to the stream of pressurized air.

In the present invention the liquid such as oil is prestressed in the form of a film before it is subjected to the stream of pressurized gas by means of aeration principles whereby the liquid, before it is subjected to the pressurized gas stream, is converted to film form. The film encloses the gas such as air and is subjected to internal lateral stress which is commensurate with the size of the bubble or area of the film and the pressure of the gas within the bubble.

It has been determined that the mist generating head 14 as well as those of the venturi and vortex types discussed hereinabove are much more efficient in producing mist and in producing a more uniform mist when the liquid forming the mist is prestressed in the form of a film foam. The liquid is apparently broken up by the pressurized gas into minute particles much more easily and with much greater effectiveness as a consequence of the prestressed condition of the liquid foam as it comes in contact with the jet of pressurized air.

Figure 2:
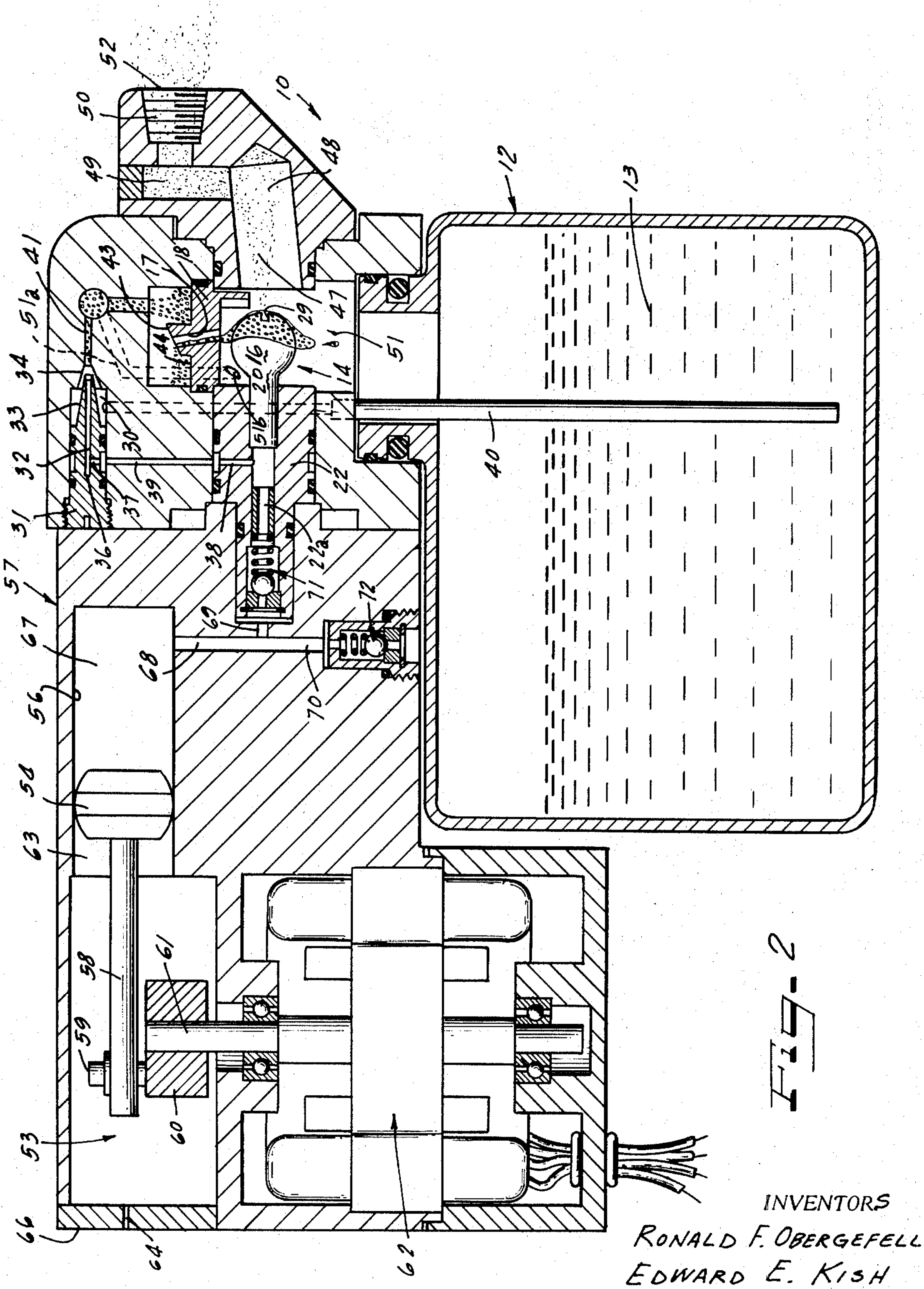
FIG. 2 is another embodiment of a mist generating system incorporating the principles of the present invention.

FIG. 2 illustrates a mist generating system which is similar to the system shown in FIG. 1 but which differs in several respects. Because of the similarity of the two systems, however, parts shown in FIG. 2 which correspond to those shown in FIG. 1 will be identified with similar reference characters.

In the embodiment shown in FIG. 2 the wet ball 16 is supplied with pressurized air from an electric motor driven self contained air compressor indicated generally at reference numeral 53. The compressor comprises a piston 54 housed in a cylinder 56 formed in a housing portion 57 adjacent the upper housing portion 11. The piston 54 is connected by means of a rack 58 to an eccentric shaft 59 extending from a drive member 60 mounted on a motor shaft 61. The shaft 61 serves as an armature shaft for an electric motor indicated at reference numeral 62 as will be appreciated by those skilled in the art.

One end 63 of the cylinder 56 disposed on the leftward side of the piston 54 is viewed in FIG. 2, communicates with ambient air through an aperture 64 formed in an end wall 66 of the housing portion 57. An opposite end 67 communicates with a passage 68 which in turn communicates with the plenum chamber 22*a* through a conduit 69 and to the reservoir 12 through a conduit 70.

A spring biased check valve 71 is mounted in the conduit 69 and another check valve 72 is mounted in the conduit 70. The valve 71 is biased to a closed position during the suction stroke of the piston 54, whereas the valve 72 is biased to a closed position during the discharge stroke of the piston. Consequently, the air which is used to provide the pressurized stream of air issuing from the aperture 29 of the wet ball 16 is drawn up from the reservoir 12, above the level of oil 13 therein, and into the wet ball as a consequence of the pumping action of the piston 54.

In the embodiments of FIGS. 1 and 3 a conduit indicated at reference numeral 51*a* communicates the passage 41, which is on the downstream side of the venturi plug 31 and is filled with oil foam, with the chamber 51 in which the wet ball 16 is disposed, thus maintaining the pressure in the passage 41 essentially at atmospheric pressure. This, of course, precludes any substantial buildup in pressure in the foam. Any foam passing through the passage 51*a* is discharged through an outlet 51*b* into the chamber 51 and thence back into the reservoir 12.

It will be appreciated that only the oil foam which flows over the aperture 29 is broken down into mist particles. The remaining foam merely falls back into the reservoir 12. However, the quantitative ratio of liquid pumped to the mist generating head to that which drops back to the reservoir is considerably lower where the liquid is aerated or foamed in accordance with the principles of the present invention as contrasted with the solid stream of liquid disclosed in prior art mist generating systems.

Although minor modifications might be suggested by those versed in the art, it should be understood that we wish to embody within the scope of the patent warranted hereon all such modifications as reasonably come within the scope of our contribution to the art.

What we claim is:

1. A method of producing a mist or aerosol comprising the steps of directing a stream of pressurized gas through a pressurized gas operated mist generating head, aerating a supply of liquid to form a foam comprising small gas-filled bubbles of the liquid, and introducing a stream of said foam into the stream of pressurized gas whereby the bubbles are broken by and minute particles of the liquid are atomized and dispersed in the gas stream.

2. A method of producing a mist or aerosol by dispersing a liquid into a gaseous medium comprising the steps of aerating a quantity of the liquid to form a foam comprising small gas-filled bubbles of the liquid whereby the liquid film which surrounds the gas in the bubbles is under an internal lateral stress, directing a stream of said foam over a smooth unconfining surface and across an aperture formed in the surface to further internally laterally stress the liquid film as it approaches and passes over the aperture, and supplying under pressure and through said aperture and toward the stream of bubbles passing across the aperture a gas which serves as the gas medium of the mist, said gas medium further stressing the liquid film and reducing same to minute particles of liquid carried away from said aperture by the gas medium in the form of a fine mist.

3. The method as defined in claim 2 wherein said smooth unconfined surface is convexly shaped.

4. A method of producing a fog comprising the steps of providing a stream of liquid-gas foam comprising small gas-filled liquid bubbles in which the liquid surrounding the gas is in the form of thin internally laterally stressed film, and directing into said stream of bubbles a stream of gas under pressure to further stress and rupture the liquid film to produce minute particles of liquid carried in the gas as a fine mist.

5. Apparatus for producing a mist comprising a pressurized gas operated mist generating head, means for directing a stream of pressurized gas through said mist generating head, means for aerating a supply of liquid to form small gas-filled bubbles of the liquid, and means for introducing a stream of said bubbles into the stream of pressurized gas whereby the bubbles are broken by and minute particles of the liquid are atomized and dispersed in the gas stream.

6. Apparatus for producing a mist or aerosol comprising means for confining a quantity of liquid, means for introducing a stream of gas into the liquid so confined to form a foam comprising small gas-filled bubbles of liquid whereby the liquid which surrounds the gas in the bubbles is in the form of a thin internally stressed film, means forming a smooth unconfining surface having an aperture formed therein, means for directing a stream of said foam over said surface and across said aperture to further internally stress the liquid film as it approaches and passes over said aperture, and means for supplying a gas medium under pressure through said aperture and toward the stream of foam passing across the aperture, whereby the liquid film is further stressed and reduced to minute particles which are carried away from said aperture in the form of a fine mist by the gas medium.

7. The invention as defined in claim 6 wherein a portion of said smooth unconfining surface is convexly shaped.

8. Apparatus for producing a liquid-gas mist of aerosol comprising means forming a reservoir for the liquid to be used in producing the mist, means forming a smooth downwardly sloping unconfining surface having an aperture formed therein, means for producing a stream of pressurized gas issuing from said aperture, and means for producing a foam comprising gas-filled bubbles of said liquid and for directing a stream of said foam onto said surface above said aperture for flowing gravitationally downwardly across said aperture to form a fine mist with said gas issuing from said aperture.

9. The invention as defined in claim 8 wherein said foam producing means comprises means forming a gas-operated venturi for drawing liquid from reservoir into said venturi means to generate said foam.

10. The invention as defined in claim 9 wherein said foam producing means further comprises an electric motor operated air compressor for supplying pressurized air to said venturi means.

* * * * *